(12) United States Patent
Carter, Sr.

(10) Patent No.: US 11,168,832 B2
(45) Date of Patent: Nov. 9, 2021

(54) MOBILE PHONE SUPPORT ARRANGEMENT

(71) Applicant: Damon A. Carter, Sr., Derry, NH (US)

(72) Inventor: Damon A. Carter, Sr., Derry, NH (US)

(*) Notice: Subject to any disclaimer, the term of this patent is extended or adjusted under 35 U.S.C. 154(b) by 0 days.

(21) Appl. No.: 16/501,241

(22) Filed: Mar. 11, 2019

(65) Prior Publication Data
US 2019/0346079 A1    Nov. 14, 2019

Related U.S. Application Data

(60) Provisional application No. 62/762,531, filed on May 8, 2018.

(51) Int. Cl.
*F16M 11/00* (2006.01)
*F16M 11/32* (2006.01)
(Continued)

(52) U.S. Cl.
CPC ............. *F16M 11/32* (2013.01); *F16B 2/005* (2013.01); *F16B 2/12* (2013.01); *F16M 11/041* (2013.01); *A47B 23/04* (2013.01)

(58) Field of Classification Search
CPC ....... A47B 23/043; A47B 97/08; A47B 19/08; A47B 3/08; F16M 11/00
(Continued)

(56) References Cited

U.S. PATENT DOCUMENTS 5,660,117 A * 8/1997 Noble .................. A47B 23/043
108/35
6,068,355 A * 5/2000 Thorp ...................... A45C 9/00
108/177

(Continued)

*Primary Examiner* — Steven M Marsh
(74) *Attorney, Agent, or Firm* — Don Halgren

(57) ABSTRACT

The invention comprises a pocket carryable, width/length adjustable, rectilinear phone support assembly, arranged to permit various safe, secure manipulable orientations thereof while supporting a mobile phone. The phone support assembly comprises a pair of $1^{st}$ corner arm assemblies and a pair of $2^{nd}$ corner arm assemblies intermatingly attached to one another. The $1^{st}$ corner support members are arranged diagonally across from one another and the $2^{nd}$ corner arm assemblies are arranged diagonally across from one another. Each $1^{st}$ corner arm assembly meets with the respective receiving member and in a member of an adjacent $2^{nd}$ corner arm assembly, and wherein each corner arm assembly has a corner hub with an elongated receiving member and an elongated inner member extending from the corner hub at an angle of 90° with respect to one another. The assembly includes a swivelable, fully articulable telescopable leg extending from a lower portion of each corner hub so as to adjustably arrange the phone support assembly and a comfortable and easily viewable manner.

18 Claims, 9 Drawing Sheets

(51) Int. Cl.
*F16M 11/04* (2006.01)
*F16B 2/00* (2006.01)
*F16B 2/12* (2006.01)
*A47B 23/04* (2006.01)

(58) Field of Classification Search
USPC ....... 248/463, 464, 465, 166, 434, 439, 460, 248/461, 441.1, 444
See application file for complete search history.

(56) References Cited

U.S. PATENT DOCUMENTS

| | | | |
|---|---|---|---|
| 8,528,489 B2 * | 9/2013 | Roy | A47B 13/003 108/125 |
| 8,915,478 B2 * | 12/2014 | Perez | F16M 11/32 248/439 |
| 10,030,447 B2 * | 7/2018 | Pyros | F16M 11/38 |
| 2005/0279907 A1 * | 12/2005 | Park | A47B 97/08 248/460 |
| 2008/0092786 A1 * | 4/2008 | Chen | A47B 3/08 108/131 |

\* cited by examiner

MOBILE PHONE SUPPORT ARRANGEMENT

This application relates to adjustable support arrangements for holding various sizes of mobile type phones, sometimes called "smartphones" or "tablets", hereinafter just called "phones". The support arrangement is utilized in a convenient and articulable manner for the user of such pocket carryable type phone or tablet and is based upon my Provisional Application No. 62/762,531 filed on May 8, 2018, which application is incorporated herein by reference in its entirety.

BACKGROUND OF THE INVENTION

Discussion of the Art

The profusion of phones (mobile phones etc. and tablets) being marketed today is extreme. Many technically savvy people own multiple phones or tablets. Of course these phones and tablets are of different sizes from one another. Further it may be desirable to utilize any of these particular phones or tablets in a different manner from one another. They may be held or supported in one position or another differently from one of their many cousins.

It is thus an object of the present invention to provide a support arrangement which is adaptable for different size phones or tablets.

It is another object of the present invention to provide a support arrangement which will hold any of those phones or tablets in almost any orientation or on/in/under any irregular surface for the convenience of its owner.

It is a further object of the present invention to provide a phone or tablet support which is restrictively expandable, and which is collapsible so as to enable jacket or pants-pocket carry, and/or low silhouette/minimal footprint storage.

It is still yet a further object of the present invention to provide an adaptable peripheral support while also enabling peripheral charging and peripheral phone/tablet hardware/controls access.

It is still yet another object of the present invention to enable complete viewing of and interaction with the entire display screen of a minimal bezel or borderless phone display screen from above or beneath the phone support arrangement while the phone is being supported thereon for viewing from above, below or alongside the support frame assembly.

It is yet another object of the present invention, to provide a support frame for a phone or tablet which may be arranged to connect to an overhead support for positioning therefrom.

BRIEF SUMMARY OF THE INVENTION

The present invention comprises a pocket carryable, width/length dimensionally adjustable, articulably supported, four-sided, elongated, mobile phone support frame assembly or arrangement for holding a rectilinear item such as a smartphone (phone) or tablet, with the screen thereof facing upwardly/angled (with respect to horizontal) and/or downwardly, the phone support frame assembly having two long sides and two short sides, although it could be square in one embodiment. The phone frame support assembly permits support of a phone on any smooth/rough/soft/angled/curved/lower/overhead surface or to enable viewing of a phone screen supported thereon, from above/alongside or beneath such phone frame support assembly, the phone supported screen facing upwardly/sidewardly/angled/downwardly as desired by the user.

The phone support assembly comprises a diagonally opposed pair of $1^{st}$ corner arm assemblies and a diagonally opposed pair of $2^{nd}$ corner arm assemblies respectively slidably intermating to form an expandable/contractable rectilinear arrangement thereof.

Each $1^{st}$ corner arm assembly is comprised of a corner hub. A short arm receiving member extends from one side of the corner hub and a long inner arm shoulder member extends from the corner hub at a 90° angle from the short arm receiving member. An elongated long inner arm member extends from the distal end of the long arm shoulder member. The long inner arm member is of generally "Y" shape in cross-section.

Each $2^{nd}$ corner arm assembly is comprised of a corner hub. A long arm receiving member extends from one side of the corner hub and a short inner arm shoulder member extends from the corner hub at a 90° angle from the long arm receiving member. A short inner arm member extends from the distal end of the short arm shoulder member. The short inner arm member is of generally Y-shape in cross-section.

Each corner hub is of cylindrical shape having an upper end with an end cap thereon and a lower end with a joint-member receiving socket therein. Each short arm receiving member and each long arm receiving member have a channel extending therealong, which channel is of conforming cross-sectional shape so as to receive and retain respective adjacent short inner arm members and long inner arm members respectively, during assembly of the mobile support arrangement of the present invention.

Each hub as an inwardly directed cut out for slightly receiving the corner of a mobile phone when the mobile support assembly is being utilized therewith. Each short arm receiving member and each long arm receiving member have an L-shaped shoulder for resting receipt of a mobile phone or thereon when the mobile support assembly is being utilized therewith.

Each end of the elongated mobile support assembly has a $2^{nd}$ corner arm assembly and a $1^{st}$ corner arm assembly slidably engaged with one another with the respective members thereof slidably engaging with the receiving member's thereof to form the rectilinear mobile phone support arrangement of the present invention.

Each end cap mounted on the upper end of its respective hub preferably has a notch thereon facing inwardly towards the center of a mobile phone supported thereadjacent. The inwardly directed notch on each end cap permits full visualization of a mobile phone screen (typically of minimal bezel or bezel-less) held therewithin. In one preferred embodiment the end cap may be pivotable so as to swing out-of-the-way when a mobile phone is being placed onto the inwardly directed shoulders of the respective long arm receiving members and short inner member shoulders. In yet another preferred embodiment, the end cap may be hingedly attached to an outer side of the hub so as to be out of the way when a mobile phone is being placed onto (or from) the phone support assembly, each embodiment arranged to enable placement onto or removal of a phone from the phone support arrangement of the present invention without the need to bi-directionally open or close the frames of the phone support arrangement Each hub may have in one embodiment, a contraction member alignment slot for retaining an elastic-like contraction member peripherally around the array of hubs at each corner assembly for additional constrictive peripheral security of a phone placed therewithin. A contraction member would be placed in each slot so as to hold the respective long arm receiving member and short inner member with their respective mating partners once a mobile phone is placed within the shelf-like arrangement of those respective corner arm assemblies. A further embodiment for contraction member securement includes a pin arranged at a shoulder in a crotch each of the hubs, around which the contraction member would be circumferentially disposed, so as to place a contraction bias upon the four corner arm assemblies, keeping them together when they are supportively enclosing a mobile phone therebetween.

The lower or bottom side of each hub has a joint member receiving socket therein. An articulable joint member is utilized and attached to the proximal end of an elongated, swivelable, telescopable leg for various support configurations of the mobile phone support assembly. In a further embodiment of the telescopable leg, the distal end of which may have a hook or a tightenable clamp thereon for specialized support of the mobile phone support assembly.

The invention thus comprises a pocket carryable, width/length adjustable, rectilinear phone support assembly, arranged to permit various safe, secure manipulable orientations thereof while peripherally supporting a mobile phone, the phone support assembly comprising: a pair of $1^{st}$ corner arm assemblies and a pair of $2^{nd}$ corner arm assemblies interdigitally attached to one another, wherein the $1^{st}$ corner support members are arranged diagonally across from one another and the $2^{nd}$ corner arm assemblies are arranged diagonally across from one another, wherein each $1^{st}$ corner arm assembly meets with the respective receiving member and in a member of an adjacent $2^{nd}$ corner arm assembly, and wherein each corner arm assembly has a corner hub with an elongated receiving member and an elongated inner member extending from the corner hub at an angle of 90° with respect to one another, wherein the corner hub has an upper end with an end cap thereon, and a lower end with a socket therein, the socket arranged to receive a joint member for articulable connection of a swivelable, telescopable leg therewith, the elongated receiving member of the $1^{st}$ and the $2^{nd}$ corner arm assembly arranged to support a mobile phone thereon. The receiving member of the $1^{st}$ corner arm assembly comprises a short arm member and a long inner arm shoulder having a long inner arm member extending distally therefrom. The receiving member of the 2nd corner arm assembly comprises a long arm receiving member and a short inner arm member with a short inner member extending distally therefrom. Each corner hub has a contraction member control means which is arranged to engage a peripheral contraction member to enable all corner arm assemblies to snugly peripherally support a mobile phone therewithin. The contraction member control means comprises a slot on an outer periphery of each corner hub so as to securely support at each corner, the contraction member. The contraction member control means comprises a pin arranged on an inside corner of each corner hub to retain the contraction member within each of the corner arm assemblies. The end cap has an inwardly facing notch thereon so as to enable a full screen presentation of a phone supported between the corner arm assemblies. The end cap may be movable with respect to the corner hub. The end cap may be pivotable with respect to the corner hub. Each receiving channel is of generally U-shape in cross-section having an elongated strip of friction bars extending centrally therewithin. Each inner arm member is of generally Y-shape in cross-section having an elongated strip of friction bars extending centrally therewithin. The respective inner arm members slides within and frictionally engages the respective receiving channels between each of the respective $1^{st}$ and $2^{nd}$ corner arm assemblies. The telescopable legs are arrangeable in a phone support assembly thickness-minimizing X configuration on the lower side of the assembled corner arm assemblies.

The invention also comprises a pocket carryable, width/length adjustable, rectilinear phone support assembly, arranged to permit various safe, secure manipulable orientations thereof while supporting a mobile phone, the phone support assembly comprising: a pair of $1^{st}$ corner assemblies arranged diagonally across from one another interengaged with a pair of $2^{nd}$ corner assemblies which are arranged diagonally across from one another to comprise a four-sided phone support perimeter, wherein each of the $1^{st}$ corner assemblies has a corner hub from which extends a short arm receiving member arranged angularly 90° apart from a long arm shoulder having a long inner arm member extending therefrom; and wherein each of the $2^{nd}$ corner assemblies has a corner hub from which extends a long arm receiving member arranged angularly 90° apart from a short inner member shoulder having a short inner member extending therefrom, wherein the long inner arm member of a respective $1^{st}$ corner arm assembly is received into a respective long arm receiving member of a respective $2^{nd}$ corner assembly, and a short inner member of a $2^{nd}$ corner assembly is received into a respectively adjacent short arm receiving member of an adjacent $1^{st}$ corner assembly for slidable engagement therebetween and peripheral engagement of a phone thereon. The long arm receiving member and the short inner member shoulder each have a phone support shoulder thereon. Each corner hub has an end cap on an upper end thereof, and wherein each end cap has an inwardly directed cutout to enable viewing of a full screen of a phone supported on the corner assemblies. The receiving members and inner member shoulders of each respective corner arm assembly are dimensionally lower than the upper end of each corner hub so as to enable access to any control or charge port on a phone supported on the phone support arrangement. Each end cap may be movable with respect to its corner hub to which it is connected to enable easier placement of a phone on the phone support arrangement. The end caps may be rotatable with respect to the corner hubs to which they are connected. The pairs of corner assemblies are biased toward their adjacent corner assemblies by securement of a contraction member peripherally arranged therearound.

The invention also includes a four-sided, dimensionally adjustable, pocket carryable, mobile phone support assembly arranged to peripherally support a mobile phone to enable the viewing of a full screen thereof in a screen-up or a screen-down orientation, comprising: an arrangement of individually adjustable legs extending each extending from a corner hub, wherein each corner hub has an articulable end cap thereon to facilitate placement and securement of a mobile phone onto the support assembly. Each corner hub as an inner arm shoulder and a receiving member extending therefrom, at an angle of 90° from one another. The inner arm shoulder and the receiving member extending from each corner hub is intermatable respectively with a receiving member and an inner arm shoulder of an adjacent corner hub. A contraction member is peripherally supported between the respective corner hubs. Each individually swivably adjustable leg has a distal end with an attachment enabling member thereon.

BRIEF DESCRIPTION OF THE DRAWINGS

The objects and advantages of the present invention will become more apparent when viewed in conjunction with the following drawings, in which:

FIG. 10 A is a perspective view of the end cap on the corner arm assembly shown in FIG. 10 with its end cap rotated in an "out of the way" orientation;

DETAILED DESCRIPTION OF THE INVENTION

Figure 1:
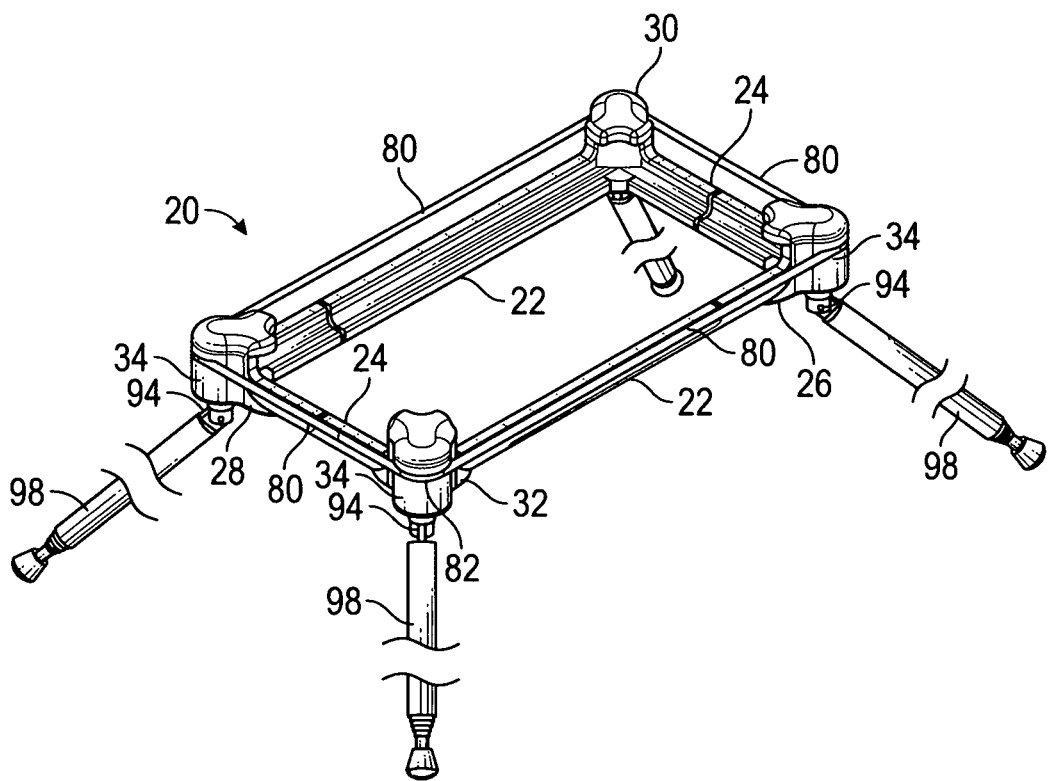
FIG. 1 is a perspective view of the articulable phone support assembly constructed according to the principles of the present invention, including its adjustable leg arrangement.
Figure 2:
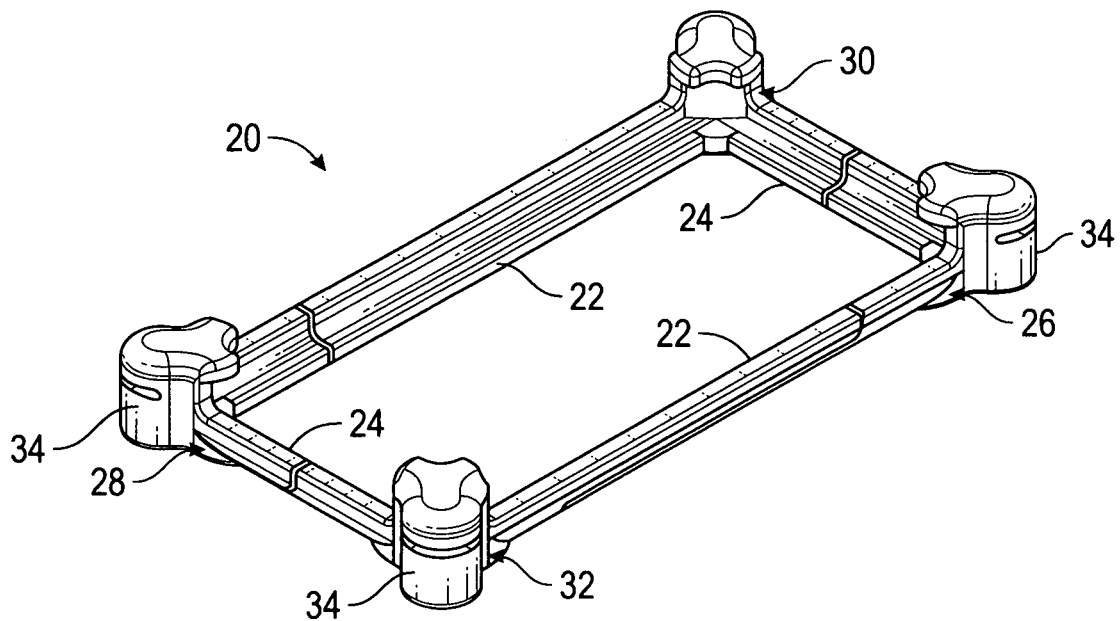
FIG. 2 is a perspective view of the phone support arrangement shown in FIG. 1 in a minimal size configuration, shown without any legs attached.
Figure 3:
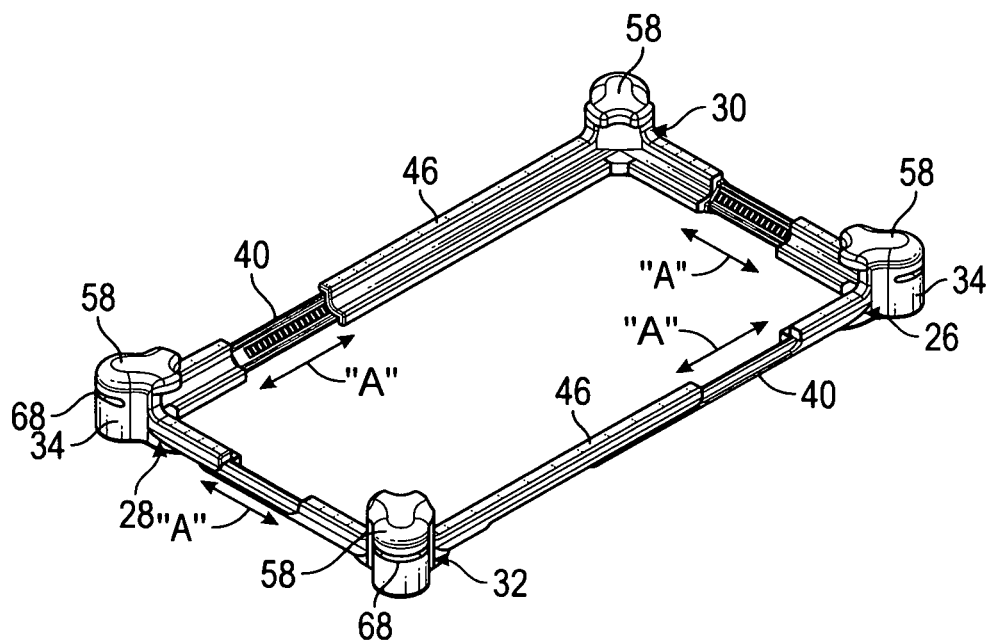
FIG. 3 is a view similar to FIG. 2 of the phone support arrangement shown in an expanded size.
Figure 14:
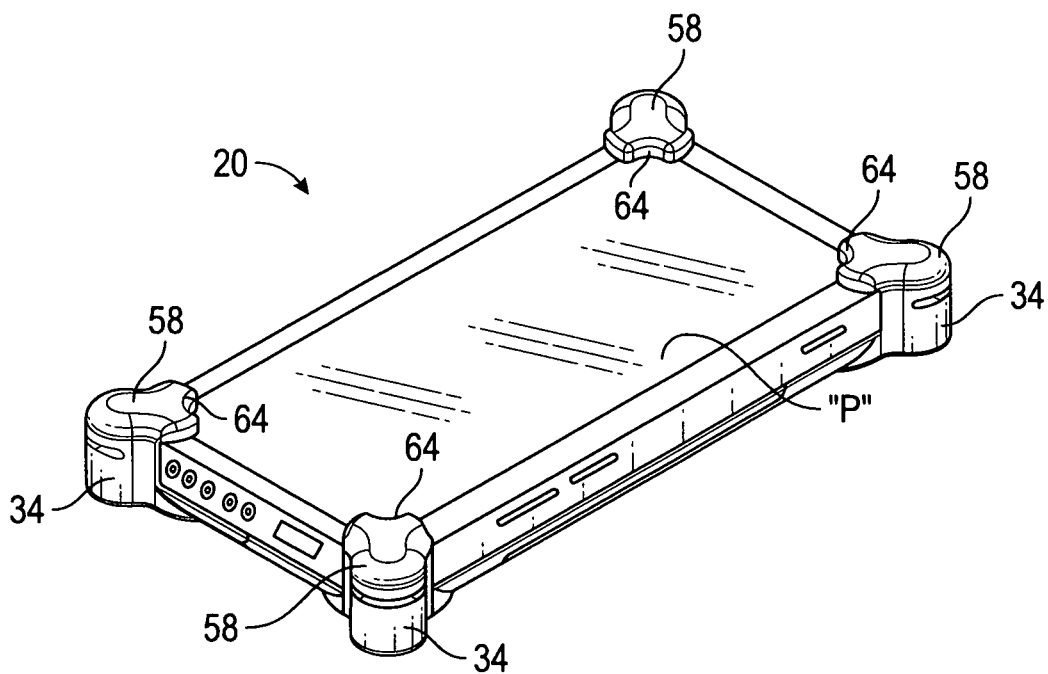
FIG. 14 is a perspective view of the phone support arrangement as shown in FIG. 2, with a mobile phone secured therewithin.

The present invention comprises a pocket carryable, width/length dimensionally adjustable, articulably supportable, four-sided, elongated, mobile phone (or tablet) support assembly 20 for holding a rectilinear item such as a phone or tablet "P" (as shown in FIG. 14), the phone support arrangement or assembly 20 having two long sides 22 and two short sides 24, (although it could be square in one embodiment), the elongated embodiment being shown in FIGS. 1-3. The width is represented by the shorter side of the phone support assembly 20, and the length is represented by the longer side of the phone assembly 20, as exemplarily shown in FIGS. 1, 2, 3, 6 and 6A.

The phone support assembly 20 comprises a diagonally opposed pair of $1^{st}$ corner arm assemblies 26 and 28, and a diagonally opposed pair of $2^{nd}$ corner arm assemblies 30 and 32, respectively slidably intermatable, as best represented in FIG. 3, by arrows "A", to form a rectilinear arrangement thereof.

Figure 4:
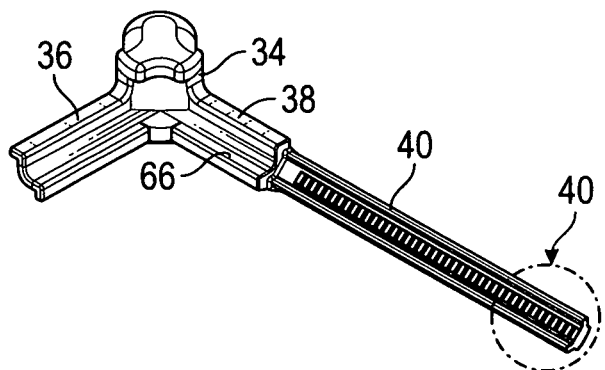
FIG. 4 is a perspective view of a first corner arm assembly.
Figure 4A:
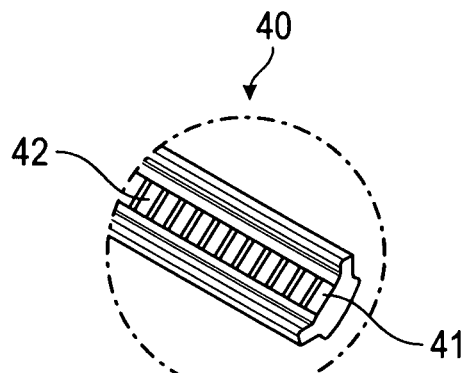
FIG. 4A is an enlarged perspective view of a distal portion of the first corner arm assembly shown in FIG. 4.
Figure 5:
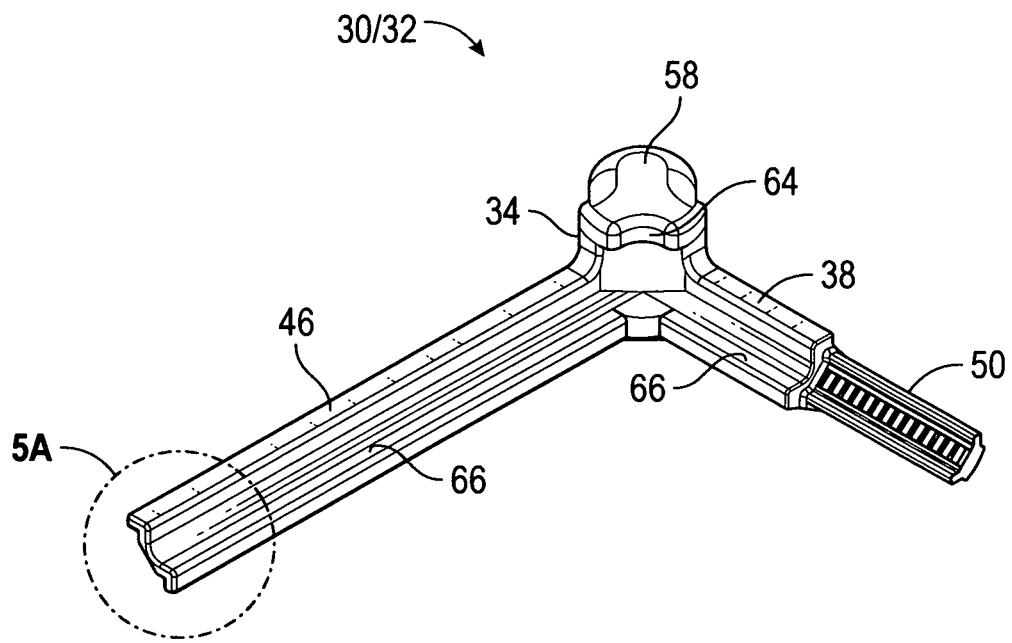
FIG. 5 is a perspective view of a second corner arm assembly.
Figure 5A:
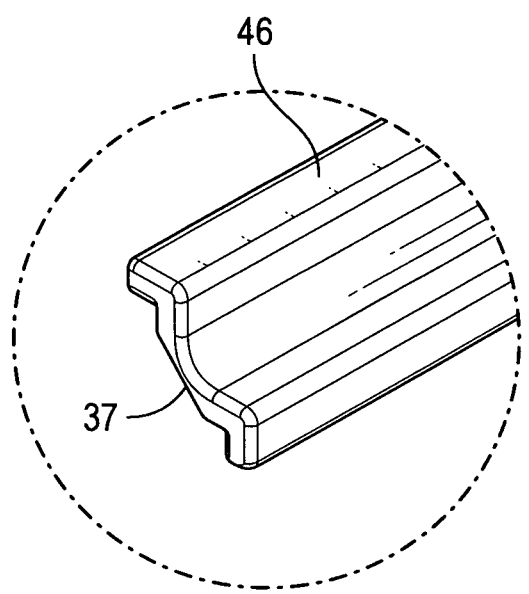
FIG. 5A is an enlarged perspective view of a distal portion of the second arm assembly shown in FIG. 5.

Each $1^{st}$ corner arm assembly 26/28, as represented best individually, in FIGS. 4 and 4A, is comprised of a corner hub 34. A short arm receiving member 36 extends from one side of the corner hub 34 and a long inner arm shoulder member 38 also extends from the corner hub 34 at a 90° angle from the short arm receiving member 36. An elongated long inner arm member 40 extends from the distal end of the long arm shoulder member 38, as shown in FIG. 4. The long inner arm member 40 is of generally "Y" shape in cross-section, as may be best noted in FIG. 4A. The long arm shoulder member 40 has a trough 41 with an elongated friction surface 42 thereon, as best seen in FIG. 4A, to act as a movement resistance factor helping keep the long arm shoulder member 40 secure within a receiving channel 37 in an adjacent long arm receiving member 46, as represented in FIGS. 5 and 5A, the slidable intermating of the long inner arm member 40 and the channel 37 of the long arm receiving member 46, best represented in FIG. 3. The short arm receiving member 36 of each $1^{st}$ corner arm assembly 26 and 28 has a similar cross-sectional shape as the long arm receiving member 46 of the respective $2^{nd}$ corner assemblies 30/32.

Each $2^{nd}$ corner arm assembly 30 and 32 is also comprised of a corner hub 34, as best represented in FIG. 5. A long arm receiving member 46 extends from one side of its respective corner hub 34 and a short inner arm shoulder member 48 extends from that respective corner hub 34 at a 90° angle from the long arm receiving member 46. A short inner arm member 50 extends from the distal end of the short arm shoulder member 48, as may be seen in FIG. 5. The short inner arm member 50 is of generally Y-shape in cross-section, as may be seen in FIG. 5A.

Each respective corner hub 34 is preferably of cylindrical shape having an upper end 56 with an end cap 58 thereon, each respective corner hub 34 having a lower end 60 with a joint-member receiving-socket 62 therein. Each short arm receiving member 36 and each long arm receiving member 46 have the channel 37 extending therealong, which channel 37 is of cross-sectional shape so as to slidingly receive and retain respective adjacent short inner arm members 50 and long inner arm members 40 respectively, during construction of the mobile support assembly 20 of the present invention.

Each hub 34 has an arcuately shaped inwardly directed cut out 64 for receiving and enabling the viewing of the corner of a mobile phone "P" viewing screen when the mobile support assembly 20 is being utilized therewith, as may be seen in FIG. 14. Each short arm receiving member 36 and each long arm receiving member 46 have an L-shaped shoulder 66 (in cross-section), as may be visualized in FIGS. 4 and 5, for resting receipt of a mobile phone thereon when the mobile support assembly 20 is being utilized therewith.

Each end of the elongated mobile support assembly 20 has a $2^{nd}$ corner arm assembly 30 (or 32) and a $1^{st}$ corner arm assembly 26 (or 28) slidably engaged with one another with the respective inner arm members 40 and 50 thereof slidably engaging with the receiving member's 46 and 36 respectively, to form the rectilinear mobile phone support arrangement 20 of the present invention, as may be best shown in FIGS. 3 and 1.

Figure 10:
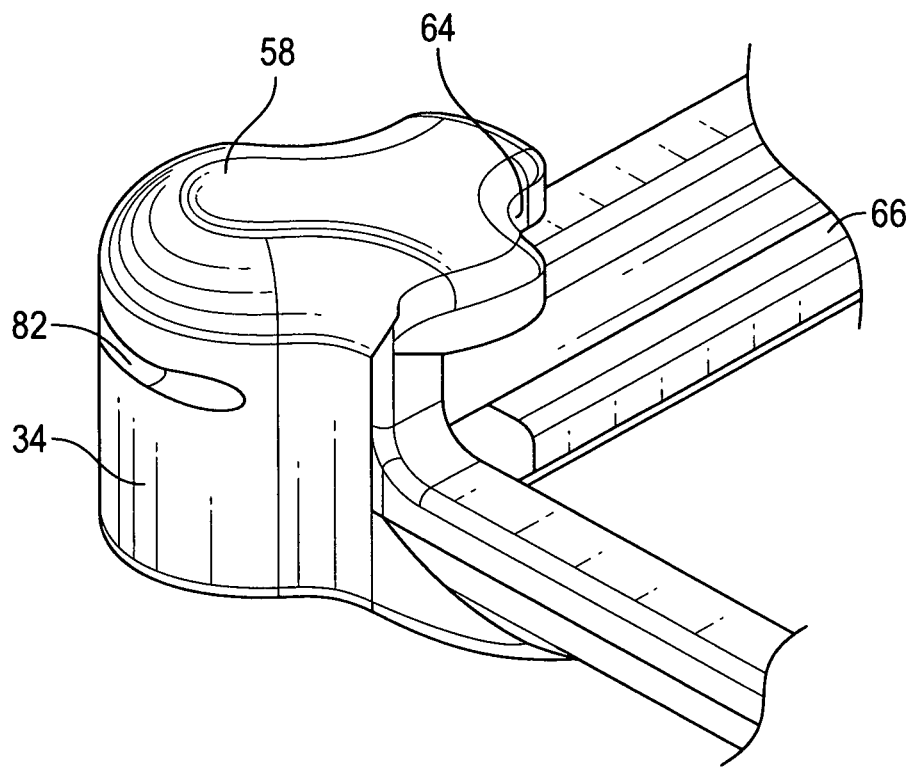
FIG. 10 is a perspective view of an articulable end cap arranged on a corner arm assembly.
Figure 10A:
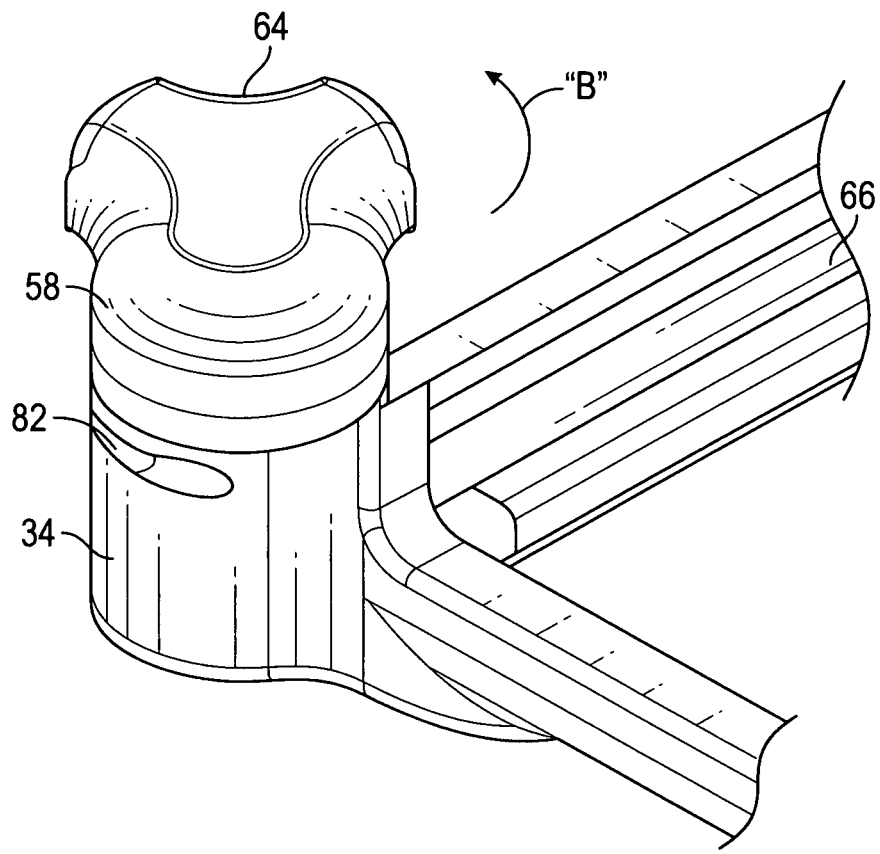
Figure 11:
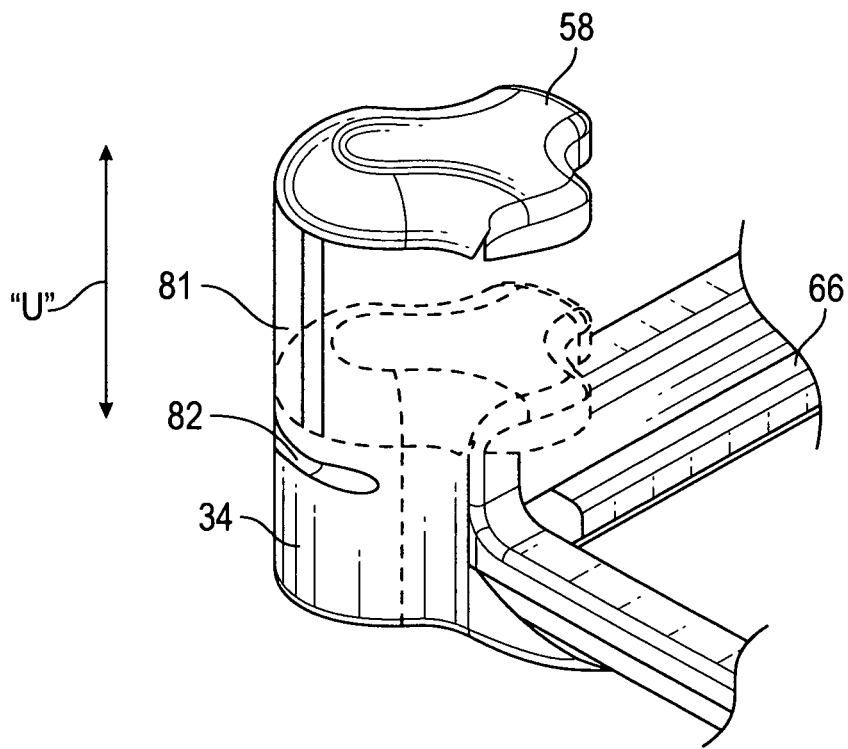
FIG. 11 is a perspective view of a further embodiment of a swivelable end cap to enable easy phone entry onto the phone support arrangement.
Figure 12:
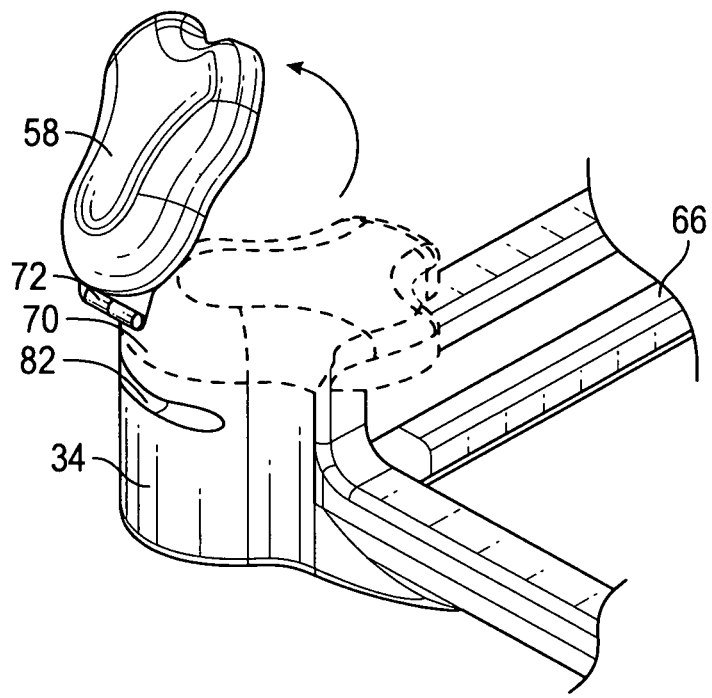
FIG. 12 is a perspective view of yet further embodiment of a tiltable articulable end cap arranged on a corner arm assembly.

Each end cap 58 mounted on the upper end 56 of its respective hub 34 has a phone screen visibility-enhancing notch 64 thereon facing inwardly towards the center of a mobile phone "P" supported thereadjacent, as represented best in FIG. 14. The inwardly directed notch 64 on each end cap 58 permits full visualization of a mobile phone screen therebeneath. In one preferred embodiment the end cap 58 as represented between FIGS. 10 and 10A, that end cap 58 may be pivotable about a pin, (not shown for clarity of the figures), so as to swing out-of-the-way, as indicated by arrow "B" in FIG. 10A, when a mobile phone is being placed onto the inwardly directed shoulders 66 of the respective long arm receiving members 46 and the shoulders 66 of the short inner members 48. In yet another preferred embodiment, shown in FIG. 11, the end cap 58 is liftable, shown attached to a pin 81 slidably movable in and out from the corner hub 34, as shown by arrow "U", to move the cap 58 up and out of the way during loading of a phone on the support assembly 20. As further shown in FIG. 12, the end cap 58 may be hingedly attached by a hinge 72 to an outer side 70 of the hub 34 so as to facilitate the loading/unloading and be out of the way, when a mobile phone is being placed onto the phone support assembly 20.

Each hub 34 may have in one embodiment, a contraction member alignment slot 82 control means for securement and retaining an elastic-like contraction member 80 peripherally around the array of hubs 34 at each corner assembly 26, 28, 30 and 32, as is represented in FIGS. 2, 3, 6, 6A, 7, and 8. The contraction member 80 would be placed in each slot 82 so as to hold the respective long arm receiving member 46 and short inner member 36 with their respective mating partners 40 and 50 once a mobile phone "P" is placed within the shelf-like arrangement of those respective corner arm assemblies 26, 28, 30 and 32.

Figure 9:
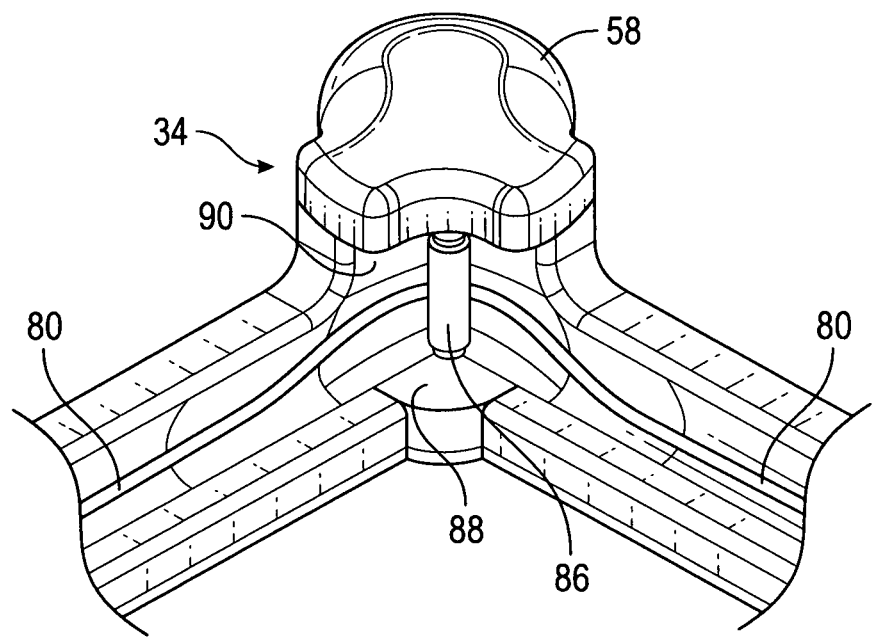
FIG. 9 is a perspective view of one embodiment of a hub showing an anchor pin for holding a peripherally arranged contraction member.

A further embodiment for contraction member securement control means includes a pin 86 arranged at a shoulder 88 in a crotch 90 in each of the hubs 34, around which the contraction member 80 would be peripherally disposed, as represented in FIG. 9, so as to place a contraction bias upon the four corner arm assemblies 26, 28, 30 and 32, keeping them pulled together when they are supportively enclosing a mobile phone therebetween.

Figure 6:
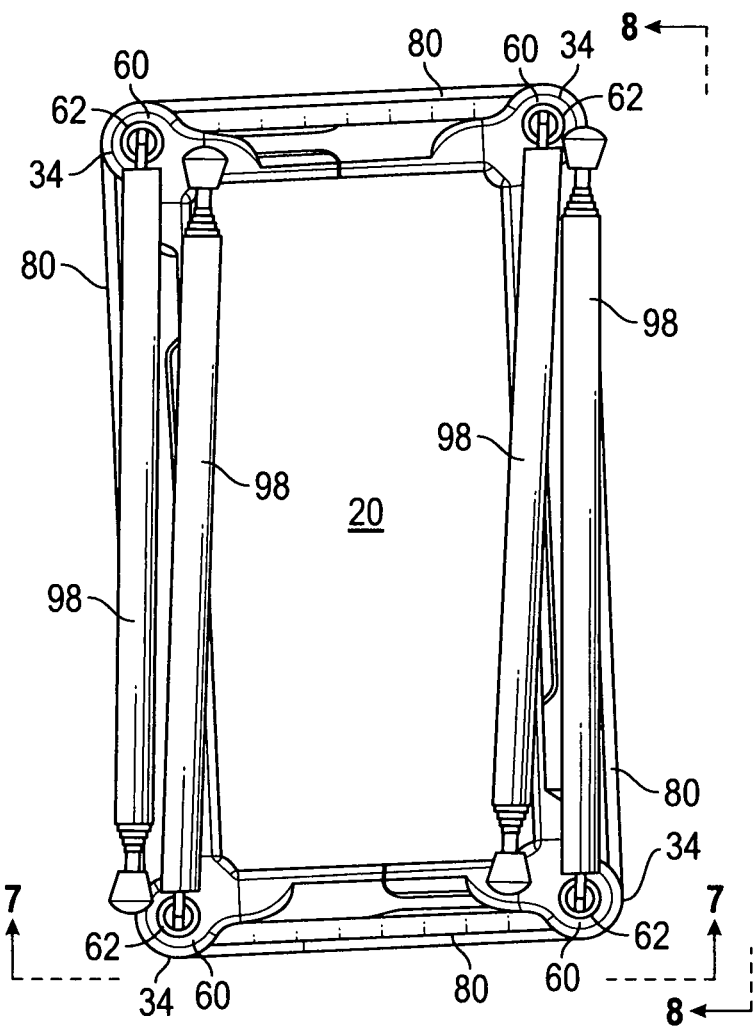
FIG. 6 is a plan view of the bottom of the phone support assembly with its corner legs in a collapsed orientation, generally parallel to the long sides of the phone support assembly.
Figure 6A:
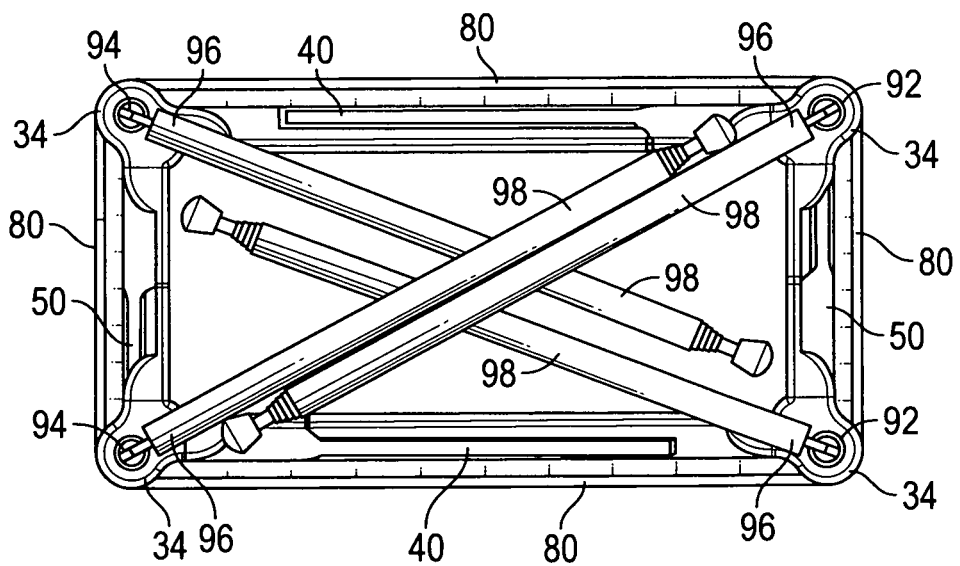
FIG. 6A is a plan view of the bottom of the phone support assembly with its corner legs in a collapsed orientation, generally in an X-shaped pattern with respect to the long sides of the phone support assembly.
Figure 7:
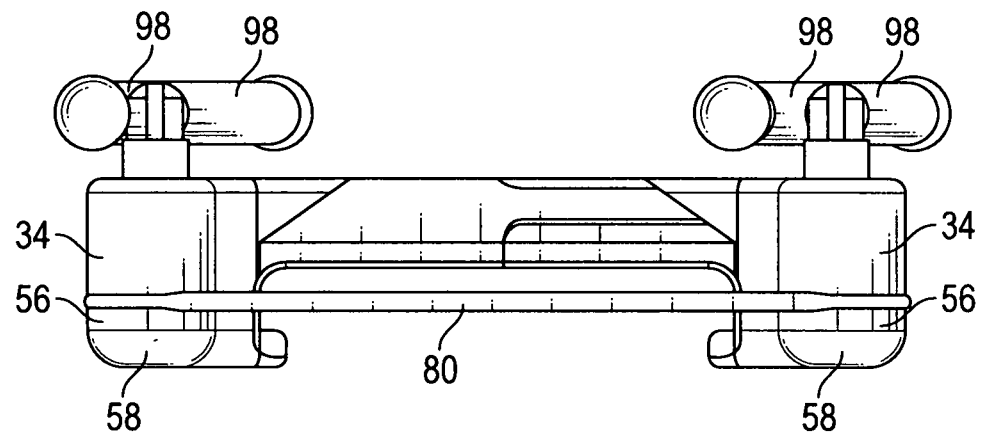
FIG. 7 is a view taken along the lines 7-7 of FIG. 6, showing the end of the phone support assembly represented in FIG. 6.
Figure 8:
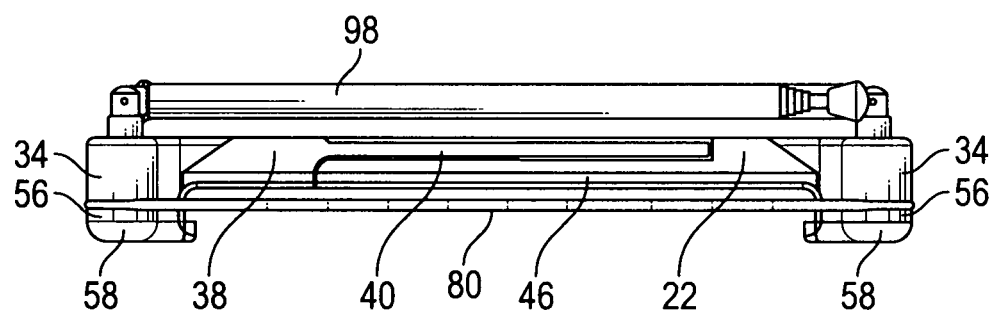
FIG. 8 is a view taken along the lines 8-8 FIG. 6, showing the side of the phone support assembly represented in FIG. 6.
Figure 13:
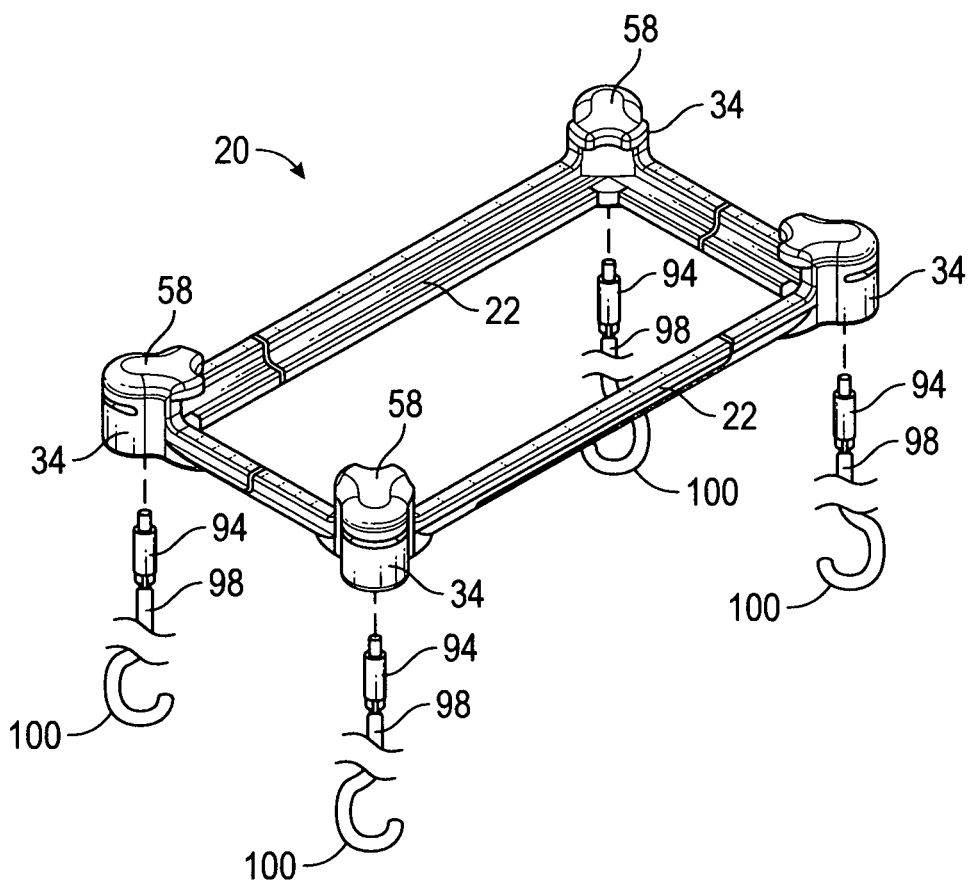
FIG. 13 is a perspective view of a the phone support arrangement with a further embodiment of a leg support member showing hookable ends thereon.
Figure 13A:
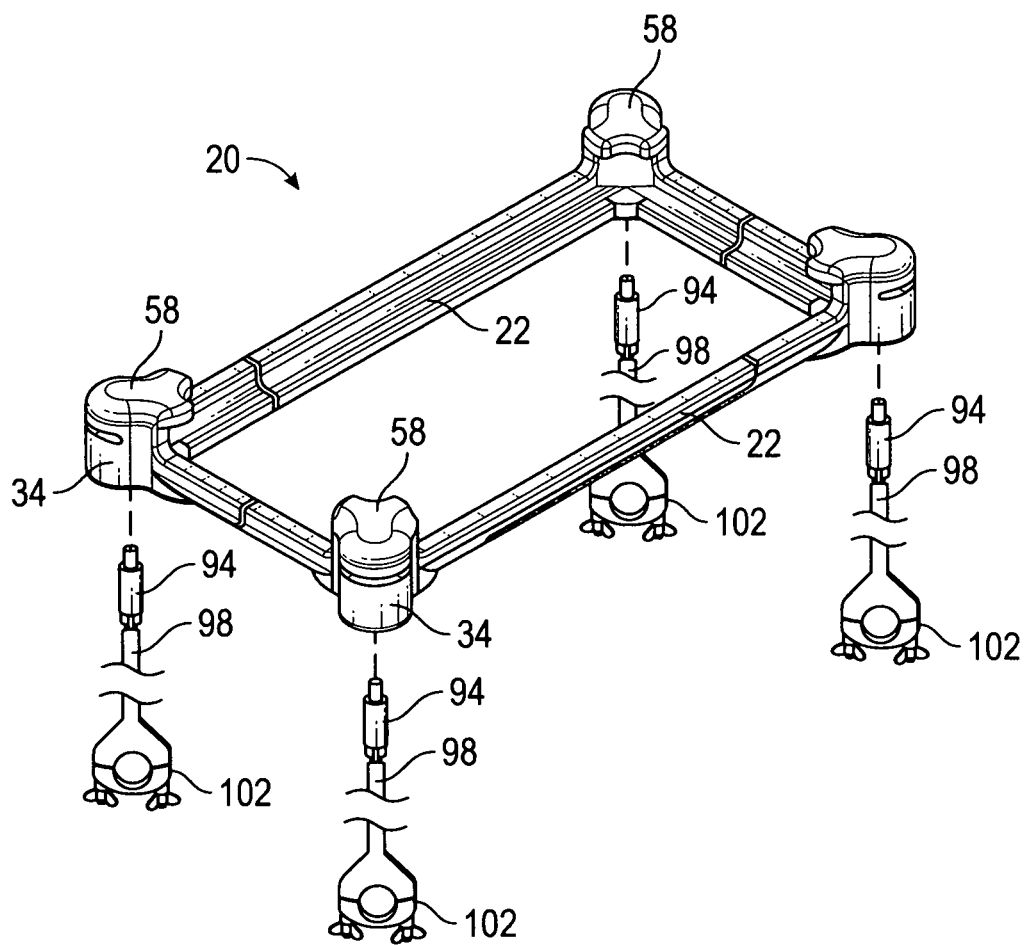
FIG. 13A is a perspective view of the phone support arrangement with a further embodiment of a leg support member showing tightenable distal ends thereon.

The lower or bottom side of each hub 34 has a joint member receiving socket 92 therein, as best seen in FIGS. 6 and 6A. An articulable joint member 94 is utilized and attached to the proximal end 96 of an elongated, swivelable, fully articulable, telescopable leg 98 for various articulable, extendable and contractable support configurations of the mobile phone support assembly 20, as represented also in FIG. 1. In a further embodiment of the telescopable leg 98, the distal end of which may have a hook 100, as shown in FIG. 13, or a tightenable clamp 102 thereon, as shown in FIG. 13A for specialized support of the mobile phone support assembly 20, onto for example, a frame member, handlebar or rail.

I claim:

1. A pocket carryable, width/length adjustable, rectilinear phone support assembly, arranged to permit various safe, secure manipulable orientations thereof while supporting a mobile phone, the phone support assembly comprising:

a pair of $1^{st}$ corner arm assemblies and a pair of $2^{nd}$ corner arm assemblies interdigitally attached to one another, wherein the $1^{st}$ corner support members are arranged diagonally across from one another and the $2^{nd}$ corner arm assemblies are arranged diagonally across from one another, wherein each $1^{st}$ corner arm assembly meets with a respective receiving member and in a member of an adjacent $2^{nd}$ corner arm assembly, and wherein each corner arm assembly has a corner hub with an elongated receiving member and an elongated inner member extending from the corner hub at an angle of 90° with respect to one another, wherein the corner hub has an upper end with an end cap thereon, and a lower end with a socket therein, the socket arranged to receive a joint member for articulable connection of a swivelable, telescopable leg therewith, the elongated receiving member of the $1^{st}$ and the $2^{nd}$ corner arm assembly arranged to support a mobile phone thereon.

2. The rectilinear phone support assembly as recited in claim 1, wherein the receiving member of the $1^{st}$ corner arm assembly comprises a short arm member and a long inner arm shoulder having a long inner arm member extending distally therefrom.

3. The rectilinear phone support assembly as recited in claim 2, wherein the receiving member of the 2nd corner arm assembly comprises a long arm receiving member and a short inner arm member with a short inner member extending distally therefrom.

4. The rectilinear phone support assembly as recited in claim 1, wherein each corner hub has a contraction member control means which is arranged to engage a peripheral contraction member to enable all corner arm assemblies to snugly peripherally support a mobile phone therewithin.

5. The rectilinear phone support assembly as recited in claim 4, wherein the contraction member control means comprises a slot on an outer periphery of each corner hub so as to securely support at each corner, the contraction member.

6. The rectilinear phone support assembly as recited in claim 5, wherein the contraction member control means also comprises a pin arranged on an inside corner of each corner hub to retain the contraction member within each of the corner arm assemblies.

7. The rectilinear phone support assembly as recited in claim 1, wherein the end cap has an inwardly facing notch thereon so as to enable a full screen presentation of a phone supported between the corner arm assemblies.

8. The rectilinear phone support assembly as recited in claim 7, wherein the end cap is movable with respect to the corner hub.

9. The rectilinear phone support assembly as recited in claim 8, wherein the end cap is pivotable with respect to the corner hub.

10. The rectilinear phone support assembly as recited in claim 3, wherein each long arm receiving member and each short arm receiving member has a receiving channel of generally U-shape in cross-section having an elongated strip of friction bars extending centrally therewithin.

11. The rectilinear phone support assembly as recited in claim 10, wherein each inner arm member is of generally Y-shape in cross-section having an elongated strip of friction bars extending centrally therewithin.

12. The rectilinear phone support assembly as recited in claim 1, wherein the respective inner arm members slides with in and frictionally engages the respective receiving channels between each of the respective $1^{st}$ and $2^{nd}$ corner arm assemblies.

13. The rectilinear phone support assembly as recited in claim 1, wherein the telescopable legs are arrangeable in a phone support assembly thickness-minimizing X configuration on the lower side of the assembled corner arm assemblies.

14. A pocket carryable width/length adjustable, rectilinear phone support assembly, arranged to permit various safe, secure manipulable orientations thereof while supporting a mobile phone, the phone support assembly comprising:
  a pair of $1^{st}$ corner assemblies arranged diagonally across from one another interengaged with a pair of $2^{nd}$ corner assemblies which are arranged diagonally across from one another to comprise a four-sided phone support perimeter, wherein each of the $1^{st}$ corner assemblies has a corner hub from which extends a short arm receiving member arranged angularly 90° apart from a long arm shoulder having a long inner arm member extending therefrom; and
  wherein each of the $2^{nd}$ corner assemblies has a corner hub from which extends a long arm receiving member arranged angularly 90° apart from a short inner member shoulder having a short inner member extending therefrom, wherein the long inner arm member of a respective $1^{st}$ corner arm assembly is received into a respective long arm receiving member of a respective $2^{nd}$ corner assembly, and a short inner member of a $2^{nd}$ corner assembly is received into a respectively adjacent short arm receiving member of an adjacent $1^{st}$ corner assembly for slidable engagement therebetween and peripheral engagement of a phone thereon.

15. The pocket carryable, width/length adjustable, rectilinear phone support assembly as recited in claim 14 wherein the long arm receiving member and the short inner member shoulder each have a phone support shoulder thereon.

16. The pocket carryable, width/length adjustable, rectilinear phone support assembly as recited in claim 14, wherein each hub as an end cap on an upper end thereof, and wherein each end cap has an inwardly directed cut out to enable viewing of a full screen of a phone supported on the corner assemblies.

17. The pocket carryable, width/length adjustable, rectilinear phone support assembly as recited in claim 14, wherein the receiving members and inner member shoulders of each respective corner arm assembly are dimensionally lower than the upper end of each corner hub so as to enable access to any control or charge port on a phone supported on the phone support assembly.

18. The pocket carryable, width/length adjustable, rectilinear phone support assembly as recited in claim 16, wherein each end cap is movable with respect to its corner hub to which it is connected to enable easier placement of a phone on the phone support assembly.

* * * * *